Jan. 24, 1961 R. R. REID, SR., ET AL 2,969,100
MEAT CHOPPERS
Filed July 13, 1959 2 Sheets-Sheet 1
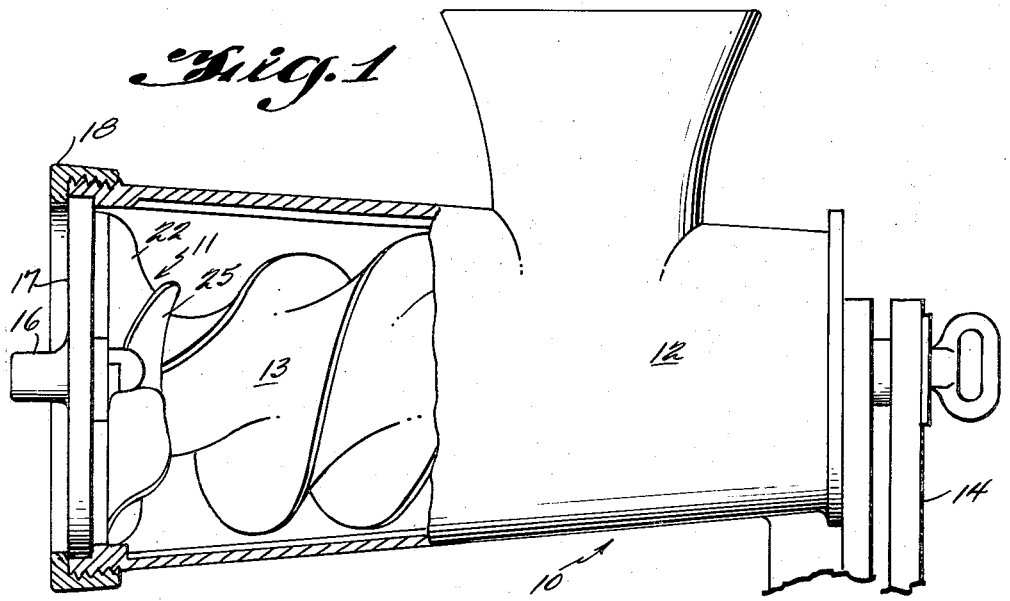
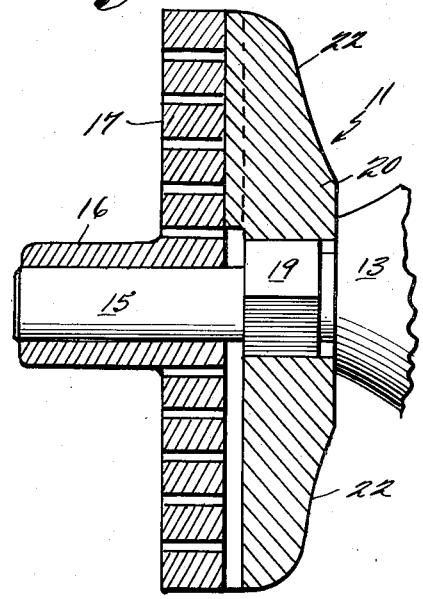
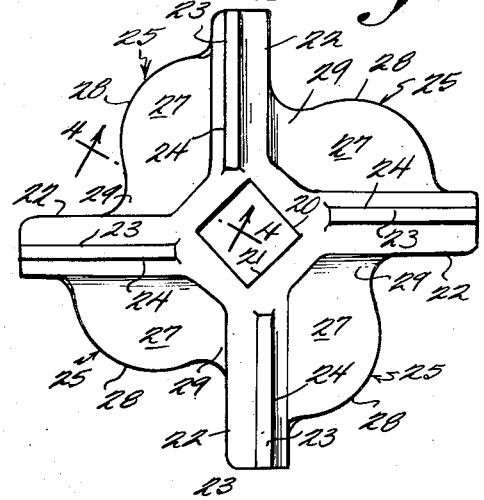
INVENTORS
REMER R. REID, SR.
EUGENE A. ANDERSON
BY Adams+Bush
ATTORNEY Jan. 24, 1961 R. R. REID, SR., ET AL 2,969,100
MEAT CHOPPERS
Filed July 13, 1959 2 Sheets-Sheet 2
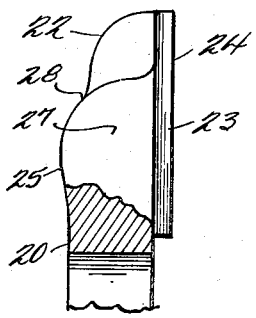
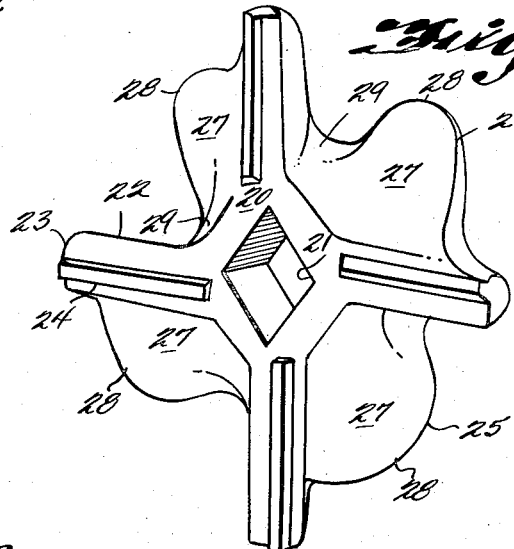
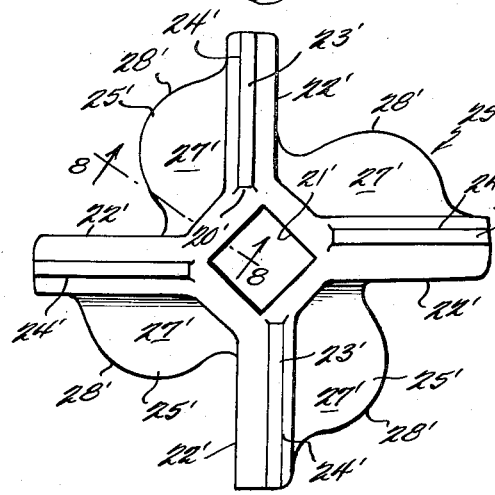
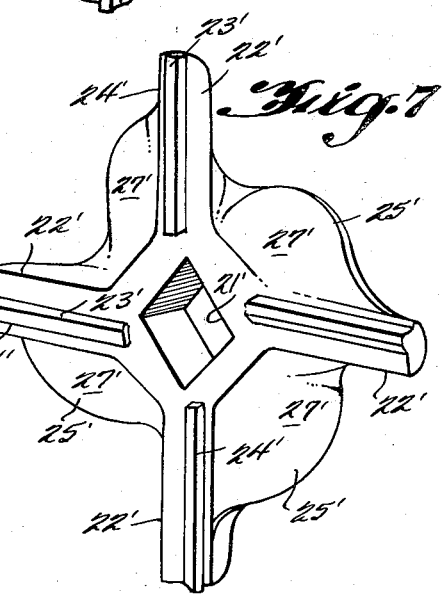
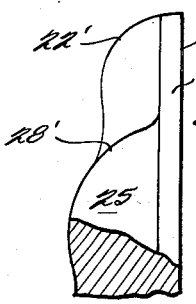
INVENTORS
REMER R. REID, SR.
EUGENE A. ANDERSON
BY
Adams & Bush
ATTORNEY United States Patent Office 2,969,100
Patented Jan. 24, 1961

2,969,100
MEAT CHOPPERS

Remer R. Reid, Sr., 824 Briarcliff Road, and Eugene A. Anderson, 1594 Evans Drive SW., both of Atlanta, Ga.

Filed July 13, 1959, Ser. No. 826,591

1 Claim. (Cl. 146—189)

This invention relates to food choppers and has more particular reference to knives employed in such choppers.

One object of the present invention is to provide a novel and improved knife for use in food choppers having spirally shaped wings formed integral with the knife with each wing projecting laterally and forwardly between an adjacent pair of knife blades and terminating at a predetermined distance from the adjacent cutting edge of the knife blade, and with the outer edge of the upper surface made sharp to shear off the chunk of meat, forcing it to the cutting edges of the cutting blades of the knife, thereby eliminating stringy meat and winding sinews and making a smoother and faster grind.

Another object of the present invention is to provide a novel and improved knife for use with meat choppers, as characterized above, which may be employed with existing meat choppers.

A further object of the present invention is to provide a knife for use with meat choppers which is simple and economical in construction and efficient in carrying out its intended function.

Other objects and advantages of the invention will appear in the following specification when considered in connection with the accompanying drawings, wherein:

Fig. 1 is a fragmentary side elevation of a meat chopper with parts shown in section and having a knife constructed in accordance with the invention mounted therein;

Fig. 2 is an enlarged fragmentary vertical sectional view of the knife shown in Fig. 1, and showing parts of the meat chopper;

Fig. 3 is a front end view of the knife shown in Fig. 1;

Fig. 4 is a fragmentary sectional view taken on the line 4—4 of Fig. 3;

Fig. 5 is a perspective view of the knife shown in Fig. 1;

Fig. 6 is a front end view of a modified form of knife;

Fig. 7 is a perspective view of the knife shown in Fig. 6; and

Fig. 8 is a fragmentary sectional view taken on the line 8—8 of Fig. 6.

The present invention provides a novel and improved knife for use with the usual commercial type of food choppers, and, in general, comprises a hub member having the usual plurality of radially projecting blades and with a plurality of circumferentially spaced wings formed integral with the hub member with each wing projecting forwardly and laterally in a spiral manner to extend between a pair of blades of the knife. The upper outer surfaces of the wings curve upwardly and outwardly in a spiral manner toward the forward side of the knife. The spiral outer edges of the wings are made sharp to cut the chunks of meat which are forced to the cutting edges of the knife blades.

Referring now to the drawings, there is illustrated in Fig. 1, a food chopper, indicated generally at 10, and having a knife, indicated generally at 11, and constructed in accordance with the present invention, mounted thereon.

The food chopper 10 may be of any suitable commercial construction and, as shown, comprises a barrel 12 having a worm 13 mounted therein provided with a handle 14 and having its stud 15 journaled in a bearing 16 formed in the perforated end plate 17, and a cup member 18 threadedly mounted on the end of the barrel for holding the plate 17 in position. The stud 15 is shown as provided with a square section 19 adjacent the end of the worm on which is mounted the knife 11. The knife 11, as shown in Figs. 1 to 5, inclusive, comprises a hub member 20 having an axial square opening 21 therein in which is received the square portion 19 of the stud of the warm when the knife is mounted in the chopper; a plurality of circumferentially spaced knife blades 22 formed integral with the hub and projecting radially therefrom, with each blade provided with a raised elongated rib 23 along one edge and provided with a cutting edge 24; and a plurality of laterally extending circumferentially spaced wing members 25 formed integral with the hub and with each wing member projecting forwardly and laterally in a spiral manner to extend between a pair of blades of the knife.

The wings of the knife are generally triangular shape in transverse cross section and their upper outer surfaces 27, as viewed in Fig. 3, curve upwardly and outwardly in a spiral manner toward the forward side of the knife and join the sides of the blades just below the cutting edges 24 thereon. The spiral outer edges 28 of the upper surfaces of the wings are made sharp to cut the chunks of meat which are forced to the cutting edges of the knife blades. The forward ends of the wings are of a width of about three-fourths the length of the knife blades and terminate in a plane which is rearward of the plane in which the cutting edges of the knife blades lie.

In this particular modification, the rear end portions of the wings adjacent the hub project rearwardly of the hub so as to fit closer to the worm (see Fig. 1), also, a gullet-like passageway 29 is formed between the upper end portion of the wing and the adjacent hub blade, thus reducing the size of the wing and the length of its cutting edge 28.

The operation of the knife and the wings is believed obvious. The spiral shaped wings with their sharpened edges shear off the chunks of fat and meat, forcing them to the cutting edges of the blades of the knife, thus eliminating stringy meat and winding sinews, eliminating the formation of balls back of the knife by the meat, and making a smoother and faster grind.

In Figs. 6, 7 and 8, there is illustrated a modified form of the invention. In this particular modification, the hub 20', with its axial opening 21' and integral blades 22' provided with their raised ribs 23' having cutting edges 24', are similar to the corresponding parts of the modification illustrated in Figs. 1 to 5, inclusive, but the wings 25' are smaller and do not extend as far back on the knife as do the wings 25 of the knife shown in Figs. 1 to 5. Also, the cutting edges 28' formed on the outer edge of the wings extend for the entire length of the outer spiral edge and no gullet-like passageways are formed between the upper ends of the wings and the adjacent blades as in the modification shown in Figs. 1 to 5, as the upper outer surfaces 27' of the wings extend from one knife blade to the next adjacent blade, curving upwardly and outwardly in a spiral manner toward the forward side of the knife, and terminate at a predetermined distance from the cutting edges 24' of the blades.

The knives of the invention may be made of steel or any other metal; preferably, steel is employed and they can be made by either drop forging or casting.

The spiral shaped wings take up where the spiral end of the worm leaves off, thus bringing the meat to the knife edge.

The back of the knife may be made so as to fit any type of worm. While the knife has been shown as provided with a square axial opening, obviously, the opening may be made of a shape to fit on the stud of any type of worm.

From the foregoing, it readily will be seen that there has been provided a novel and improved knife for use with meat grinding food choppers for preventing sinews and gristle from forming a ball back of the knife, a knife provided with integral spiral wing-like members having cutting edges for cutting the chunks of meat and having an upper surface extending in a spiral manner toward the knife blades to force the meat to the cutting edges of the blades, thus making a smooth and faster grind.

Obviously, the invention is not restricted to the modifications herein shown and described.

What is claimed is:

An attachment for use with a meat chopper having a feeder worm encased in a barrel and a knife cooperating with a perforated plate, said knife comprising a hub having a central opening, a plurality of cutter blades extending outwardly from said hub, propeller-like wings attached to said hub and positioned respectively adjacent and extending spirally from said blades, whereby in operation said blades will force material being chopped toward said perforated plate and avoid the formation of sinew and gristle balls behind said knife.

References Cited in the file of this patent

UNITED STATES PATENTS

| | | |
|---|---|---|
| 745,079 | Smith | Nov. 24, 1903 |
| 2,924,258 | Reid | Feb. 9, 1960 |